United States Patent Office 3,356,382
Patented Dec. 5, 1967

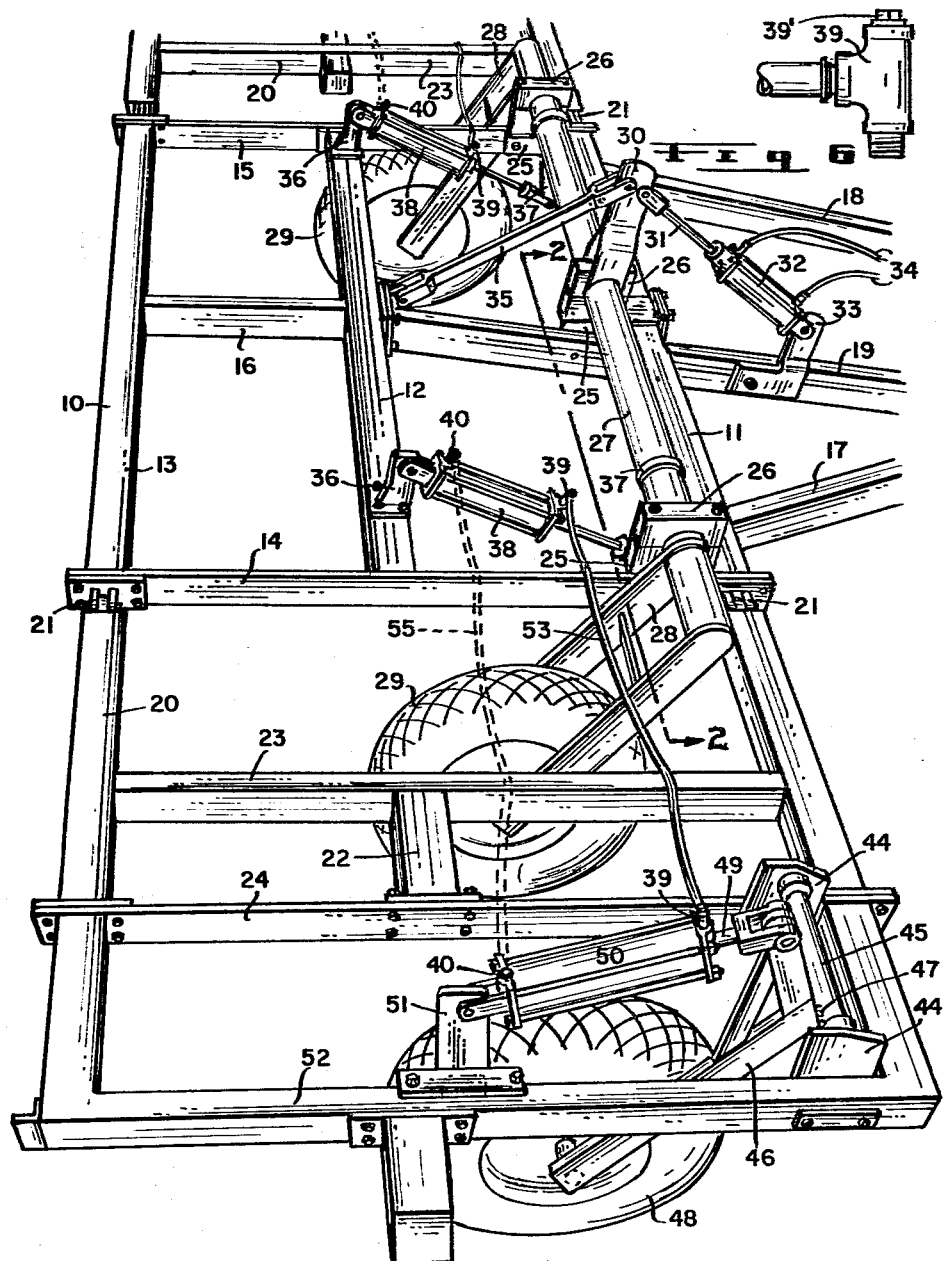

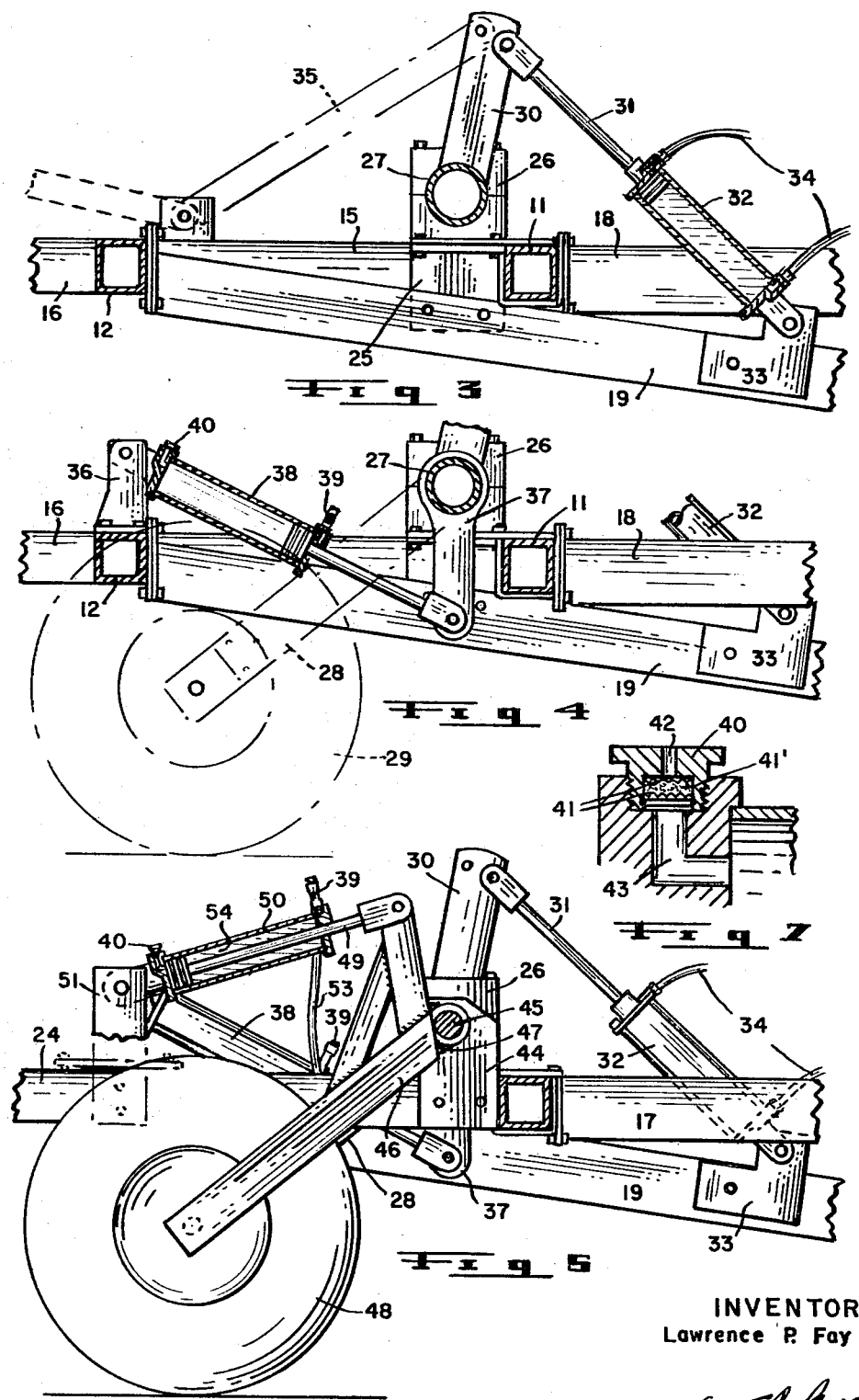

3,356,382
HYDRAULIC HEIGHT CONTROLS
Lawrence P. Fay, Regina, Saskatchewan, Canada, assignor to Roll-O-Flex Limited, Regina, Saskatchewan, Canada
Filed Nov. 16, 1966, Ser. No. 594,847
5 Claims. (Cl. 280—43.23)

This invention relates to farm machinery, particularly to plows, cultivators, seeders and the like wherein the frames of these machines are lowered and raised for tool contact with or release from the ground, and flexible frame extensions or wings must also be lowered and raised simultaneously therewith. Heretofore, the elevation connections between the frame and wings have been in the form of cable mechanisms, which are inclined to wear and break, or require continual adjustment.

The principal object of the present invention is: to provide a hydraulic system for lowering and raising the machine frame, including a subordinate hydraulic arrangement for lowering and raising the wings of said machine in uniplanar relation with the main frame.

A further object of the invention is: to provide support wheels for both the frame and the wing extensions and control the height of said parts on said wheels by the above mentioned hydraulic means.

A further object of the invention is: to provide fluid operational means between the two hydraulic systems for a series operation, or provide a parallel operation in the form of a closed fluid circuit arrangement therebetween.

A still further object of the invention is: to design the above height controlling operations of the frame and wings by a manual control on the draft tractor of the machine.

With the above important and other minor objects in view, which will become more apparent as the disclosure of such proceeds, the invention consists essentially in the construction and arrangement of the various parts hereinafter more particularly described, reference being had to the accompanying drawings wherein:

FIGURE 1 is a perspective view of the complete machine with a pair of pivoted extension wings, and with the height controlling mechanism installed thereon.

FIGURE 2 is a longitudinal section taken vertically on the line 2—2 of FIGURE 1.

FIGURE 3 is an enlarged partial cross section of the machine frame taken on the line 3—3 of FIGURE 2 and showing the master ram cylinder in cross section.

FIGURE 4 is an enlarged partial cross section of the machine frame taken on the line 4—4 of FIGURE 2 and showing a control ram cylinder in cross section.

FIGURE 5 is a partial end view of one of the wings of the machine, with the end cross bar thereof removed, parts of the main frame showing in the background, and a slave ram cylinder shown in cross section.

FIGURE 6 is an enlarged side view of a T connection for the ram ends.

FIGURE 7 is an enlarged section through the free end of a series operated ram cylinder.

In the drawings like characters of reference indicate corresponding parts in the several figures.

The main frame of the machine is shown at 10 in FIGURE 1. This frame comprises front, intermediate and rear longitudinal beams 11, 12 and 13 respectively, which are preferably of a square cross section. The ends of these beams are covered by bars 14 and 15 while the central part of the machine receives a tubular square-cornered partial cross beam 16, between the beams 12 and 13. A pair of converging beams 17 and 18 project from the front longitudinal beam 11 and a central lower beam 19 slopes from the beam 12 and under the beam 11 to provide a forward draft connection (not shown) with the beams 17 and 18.

A pair of wing extensions 20 are pivotally mounted at 21 on each end of the main frame 10, and are adapted to be in aligned relation therewith, except when the machine is travelling over undulating ground surface. These wings each comprise a U-shaped framework having an H-shaped interior build-up 22 centrally connected thereacross. One side 23 of the H is a rectangular tubing while the other side 24 is a bar. The above is a general description of a complete framework for the farm machines mentioned. The present invention is mounted on this framework and will now be described.

Angle brackets 25, best shown in FIGURE 2, are mounted on the bars 14, 15, and the central draft bar 19 of the main frame. These brackets are adapted to support bearings 26 which are bolted thereon and which rotatably support a tubular lengthwise shaft 27 on the front part of the frame. Each end of the shaft 27 is provided with a forked crank 28 which passes down and straddles one of a pair of ground wheels 29 for support of the main frame 10. A central crank 30 straddles the central bearing 26 and controls the tubular shaft 27, while its upper end pivotally connects the piston rod 31 of a master ram 32 with a bracket 33 on the beam 19, and which pivotally carries the master ram body. Suitable hoses 34 connect with opposite ends of this master ram and then pass ahead to the draft tractor (not shown) for operational control therefrom. Accordingly, from the above it will be appreciated that the master ram, through the crank 30, will rotate the shaft 37 and raise or lower the main frame 10 on the ground wheels 29.

By observing the drawings it will be seen that the main frame 10 has been raised to its highest elevation, and a link 35 connects the top of the crank 30 with the frame beam 12 to lock the main frame in this elevated position. When the draft tractor (not shown) is attached however, and the frame is to be controlled therefrom, this link is disconnected from the crank 30 and swung back over the frame, as shown in dotted outline in FIGURE 3.

By observing FIGURE 1 it will be seen that a pair of upstanding brackets 36 are provided on each end of the lengthwise frame beam 12, and a pair of downwardly extending cranks 37 (see FIGURE 4) are provided there opposite on the shaft 27, just inside the outer bearings 26. A pair of control rams 38 each have one end thereof pivotally mounted on one of the brackets 36 and their outer piston rods are pivotally connected each to the lower end of one of the cranks 37, so that when the master ram 32 is operated to rotate the shaft 27, these control rams will be operated by the cranks 37. The lower ends of the rams 38 each receive a T fitting 39, shown in FIGURE 6 and which connects with the ram cylinder, while the upper ends of said latter rams are provided with breather connections 40, shown in detail in FIGURE 7. These breather connections consist of a fitting screwed into the ram end and they are interiorly provided with a pair of screens 41 which are spaced apart by suitable filtering material 41'. A passage 42 is provided through the breather and connects through the screens with a passage 43 to the interior of the ram cylinder. Accordingly, when the main frame is raised and lowered by the master ram 32, the pistons of the control rams 38 will slide along their cylinders and air will be drawn into the cylinders through the breathers or expelled therefrom in the reverse manner.

The outer cross bars of the wing extensions 20 and the cross bars 24 are each provided with upstanding brackets 44 which rotatably receive a stub shaft 45 therebetween. A bell crank 46, formed from three welded bars, has the corner thereof welded at 47 to the stub shaft. The lower long arms of these bell cranks are rotatably carried by ground wheels 48 while the upper short arms are pivotally connected to the piston rods 49 of slave rams 50. The opposite ends of these latter rams are pivotally mounted on brackets 51 carried by the end cross bars 52 of the wing extensions. The upper ends of the rams 50 are also provided with T fittings 39 in the same manner as the control rams 38; and a suitable flexible hose 53 connects these fittings on both rams, while the lower ends of the slave rams are each provided with a breather fitting 40 for similar operation to the rams 38.

In setting up the machine frame and wings for operation, the main frame is raised to its highest elevation as shown. The outer ends of the wings are then suitably raised until their upper surfaces are flush with the upper surface of the main frame. It will be seen from FIGURE 5 that the pistons of the slave rams will have moved to the bottom of these cylinders. The T fittings 39 on the slave rams will then have their upper plugs 39′ removed so their ends of the cylinders can be filled with oil, indicated at 54. As the hoses 53 will also be filled, a complete oil communication is provided with the control ram pistons, when the plugs are re-connected. Accordingly, when the wing extensions are released they will be supported in alignment with the main frame by the oil, which prevents the slave pistons from rising against the control pistons. However, when the master ram 32 is operated to lower the main frame, the cranks 37 will release the control pistons upwardly and oil will follow therebehind as the weight of the wing extensions will rotate the bell cranks 46 to move the pistons of the slave rams upward and drive the oil 54 into the control rams. Accordingly, the frame and wings merely need the attachment of plows or cultivators on the beams at the correct locations, and the machines are ready for action.

As the throw of the long arms of the bell cranks 46 are the same as the forked cranks 28, the throw of the short arms of the bell cranks 46 are the same as the cranks 37, the brackets 36 and 51 are the same height, the control ram pistons have the same stroke as the pistons of the slave rams 50, and the oil cannot be compressed, the wing extensions must raise and lower in uniplanar relation with the main frame when the master ram 32 is operated, except of course when the machine is travelling over undulating ground surface. In other words; the operator of the tractor (not shown) controls the master ram and so controls the other rams for this synchronized raising and lowering movement.

While it is both possible and practical to connect the control rams directly to the forked cranks 28, it has been found that said rams would be too close to the ground wheels and trash would collect therebetween. Accordingly, separate cranks 37 have been used. It will also be understood that the piston rods of the control and slave rams will reduce the oil pressure area of these pistons. Accordingly, the rod ends of these rams have been connected together by the hose 53 as the oil displacement is equal and the corresponding lift of the frame and wings will be equal. The opposite ends of these rams require the breather fittings to prevent excessive air resistance at said ends.

If desired, T fittings 39 could be substituted for the breather fittings. These T fittings would be hose-connected as indicated in dotted outlines 55 in FIGURE 1. Accordingly, oil will flow on both sides of the control and slave pistons in what might be termed a parallel set-up or closed circuit, and would give the same results.

The construction just disclosed is very simple and gives quiet operation as well as efficiency. It is being very favorably received by the farming public.

What I claim as my invention is:

1. In a land working machine of the class described having a frame and a pivoted wing extending from said frame; a hydraulic height control for said frame and wing, comprising: a shaft rotatably mounted on the frame and having a crank connection with a frame support wheel; a master ram mounted on the frame for power rotation of the shaft, to change the height of the frame on the support wheel, through said crank connection; a control ram mounted on the frame and operable by the rotation of the shaft; a crank pivotally mounted between the wing and a wheel for said wing support; a slave ram pivoted between said crank and the wing for changing the height of the wing on its support wheel; and a flexible connection between one end of the control ram and one end of the slave ram for fluid transfer therebetween to raise and lower the frame and the wing, in the operation of the master ram.

2. A hydraulic height control as defined in claim 1, wherein said crank connection consists of a forked crank at one end of the shaft rotatably receiving the frame support wheel in straddled relation; and the opposite ends of the control and slave rams provided with breather fittings for unrestricted movement of the pistons of said latter rams.

3. A hydraulic height control as defined in claim 1, wherein the crank between the wing and its support wheel consists of a bell crank on a stub axle which is rotatably mounted on the wing; one arm of said bell crank receiving the wing support wheel for rotation thereon and the other arm providing one of the pivots for the slave ram.

4. A hydraulic height control as defined in claim 1, wherein a pair of flexible hose connections are provided in parallel between the control ram and the slave ram, one hose connecting the piston rod end of said latter rams and the other hose connecting the opposite ends of said latter rams.

5. In a land working machine of the class described having a frame and a pivoted wing extending from each end of said frame; a hydraulic height control for said frame and wings, comprising: a shaft rotatably mounted on the frame; a forked crank secured on each end of said shaft and each crank receiving a frame support wheel in straddled relation therewith; a master ram mounted on said frame for power rotation of said shaft to change the height of the frame on said support wheels through said cranks; means on said master ram for connection with a source of fluid power; a pair of control rams, one positioned adjacent each end of the frame and for crank operation by the rotation of said shaft; a pair of bell cranks each pivotally mounted on one of said wings; one of the arms of each bell crank rotatably receiving a wing support wheel for rotation thereon; a pair of slave rams each pivotally connecting the opposite end of one of said bell cranks with a bracket on one of said wings; a flexible hose connecting from one end of each control ram to one end of each slave ram for fluid passage to, and operation of, said slave rams, to height-change their respective wings in uniplanar relation with the frame, in the operation of said master ram; and means for supplying fluid to said control and slave rams.

References Cited
UNITED STATES PATENTS

Re. 22,932  11/1947  Action _____ 172—316
3,033,296   5/1962   Kaufman et al. _____ 172—421
3,321,031   5/1967   Evans _____ 172—657

BENJAMIN HERSH, *Primary Examiner.*

J. SIEGEL, *Assistant Examiner.*